Patented July 25, 1944

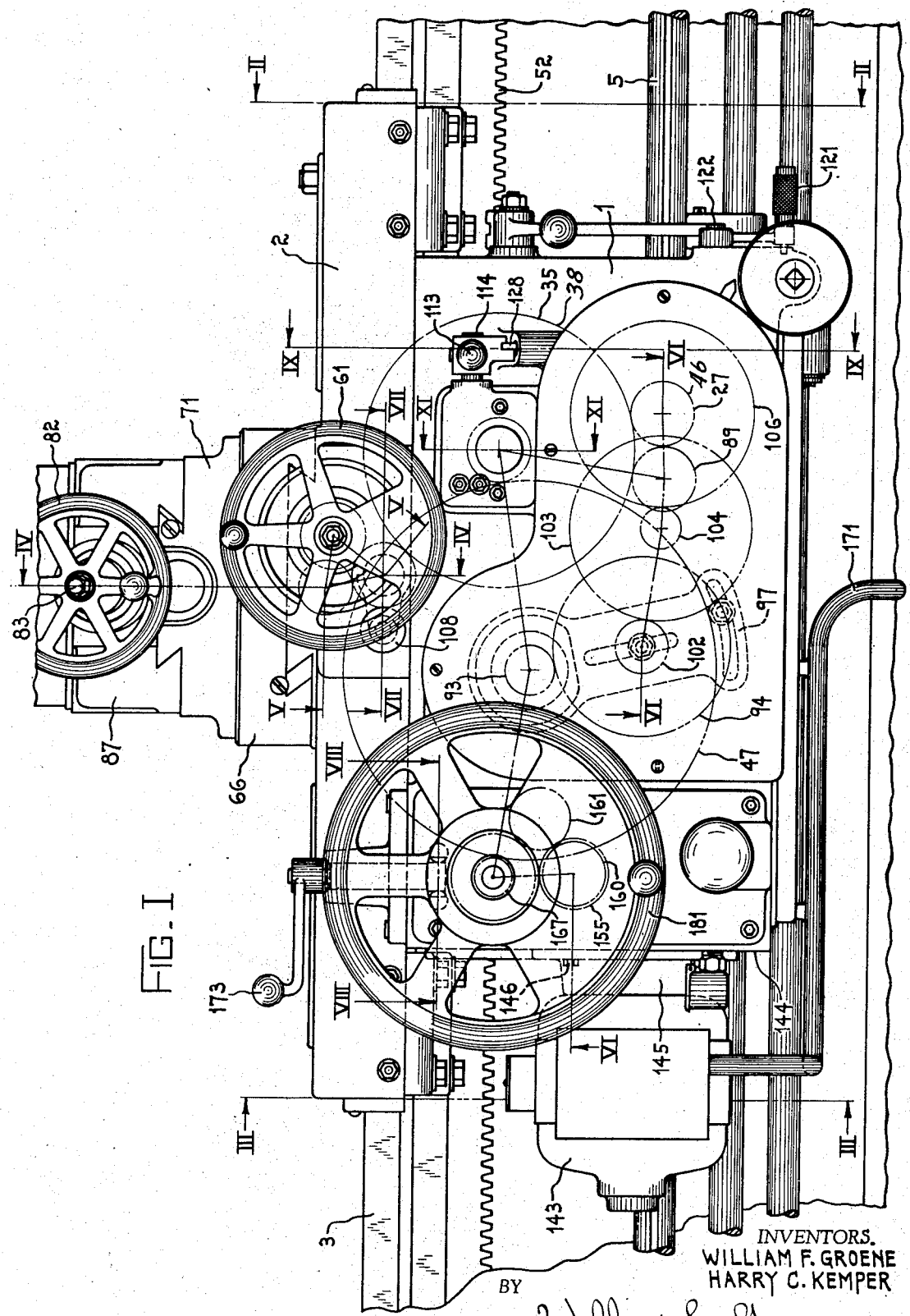

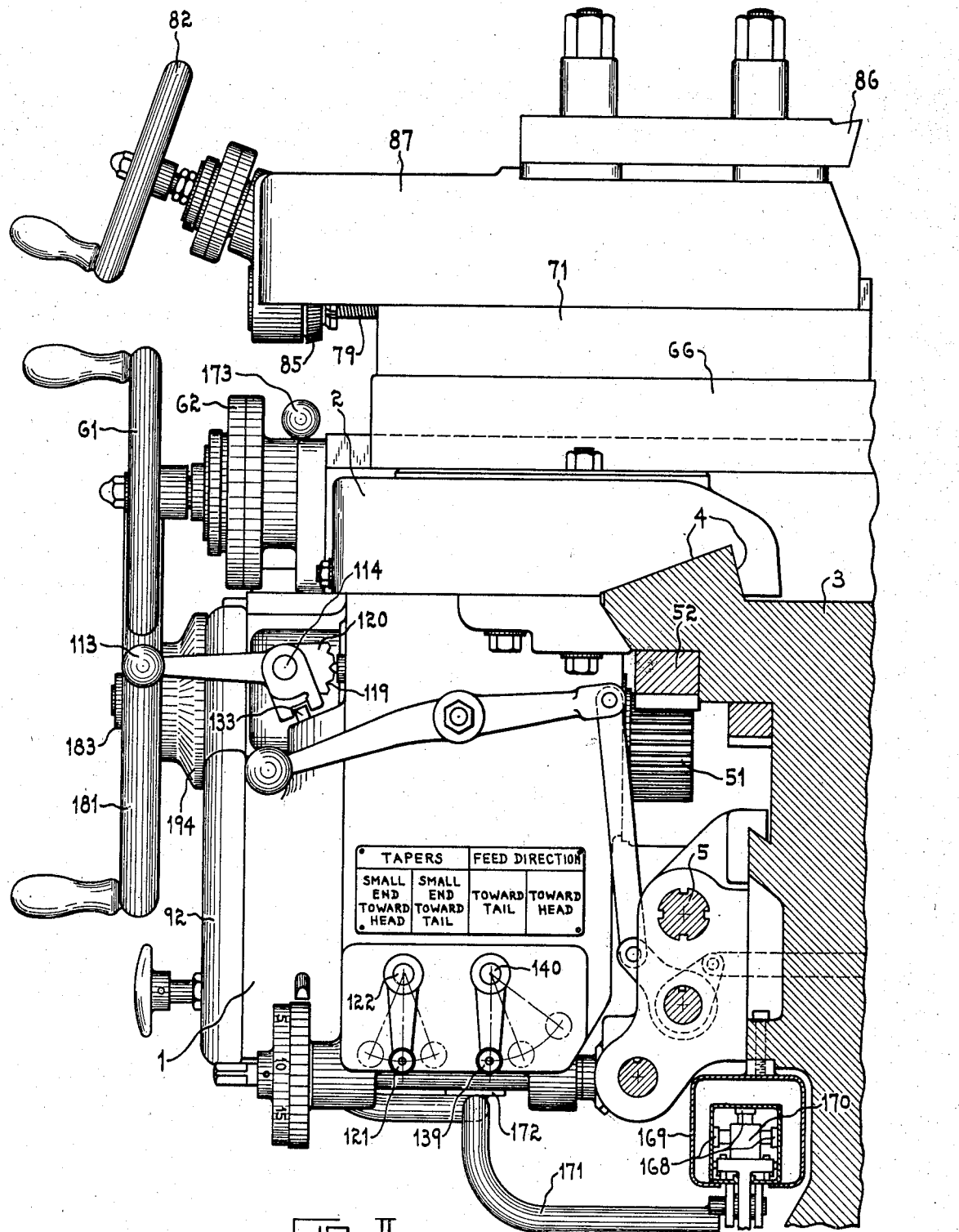

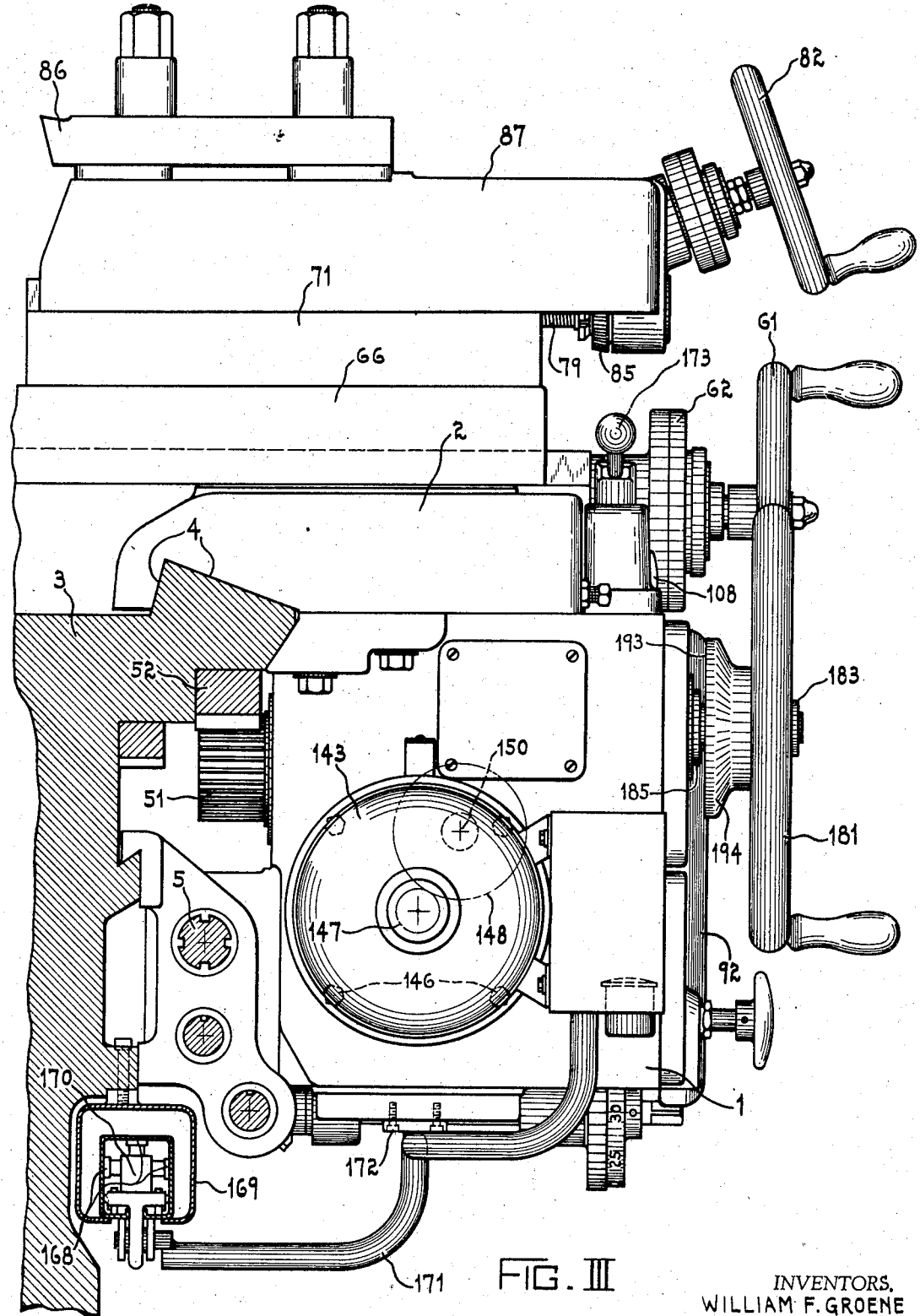
FIG. III
INVENTORS.
WILLIAM F. GROENE
HARRY C. KEMPER

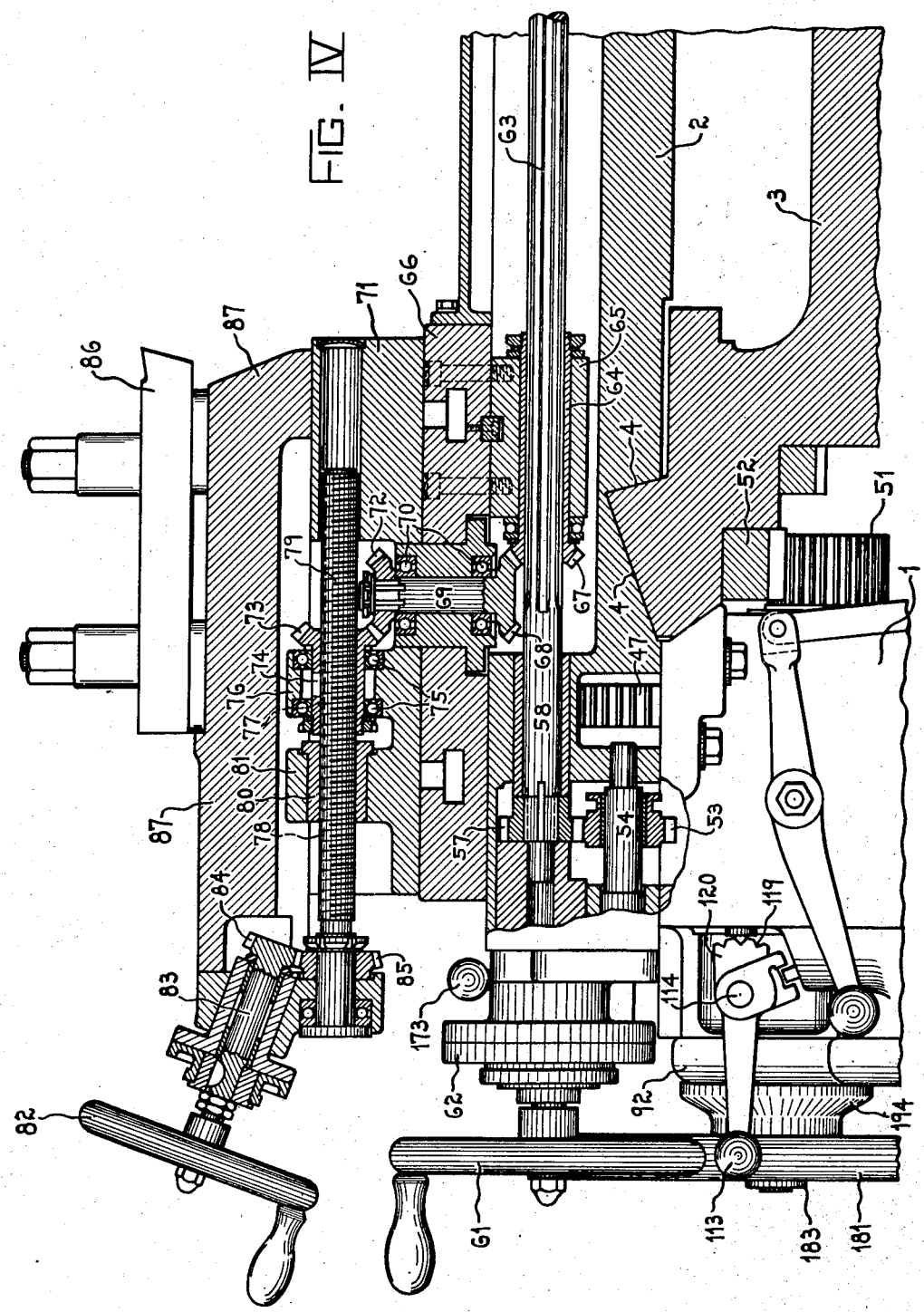

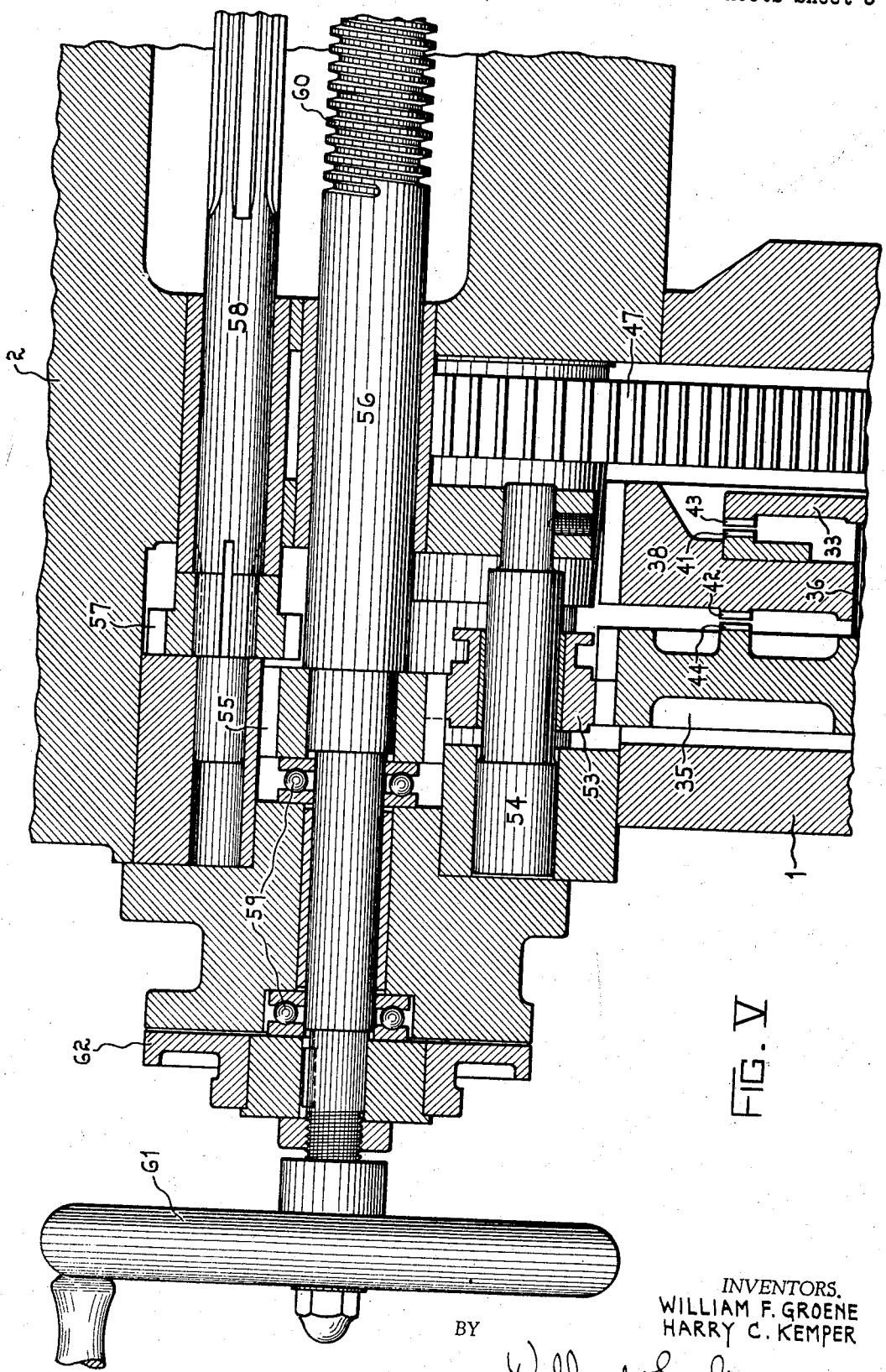

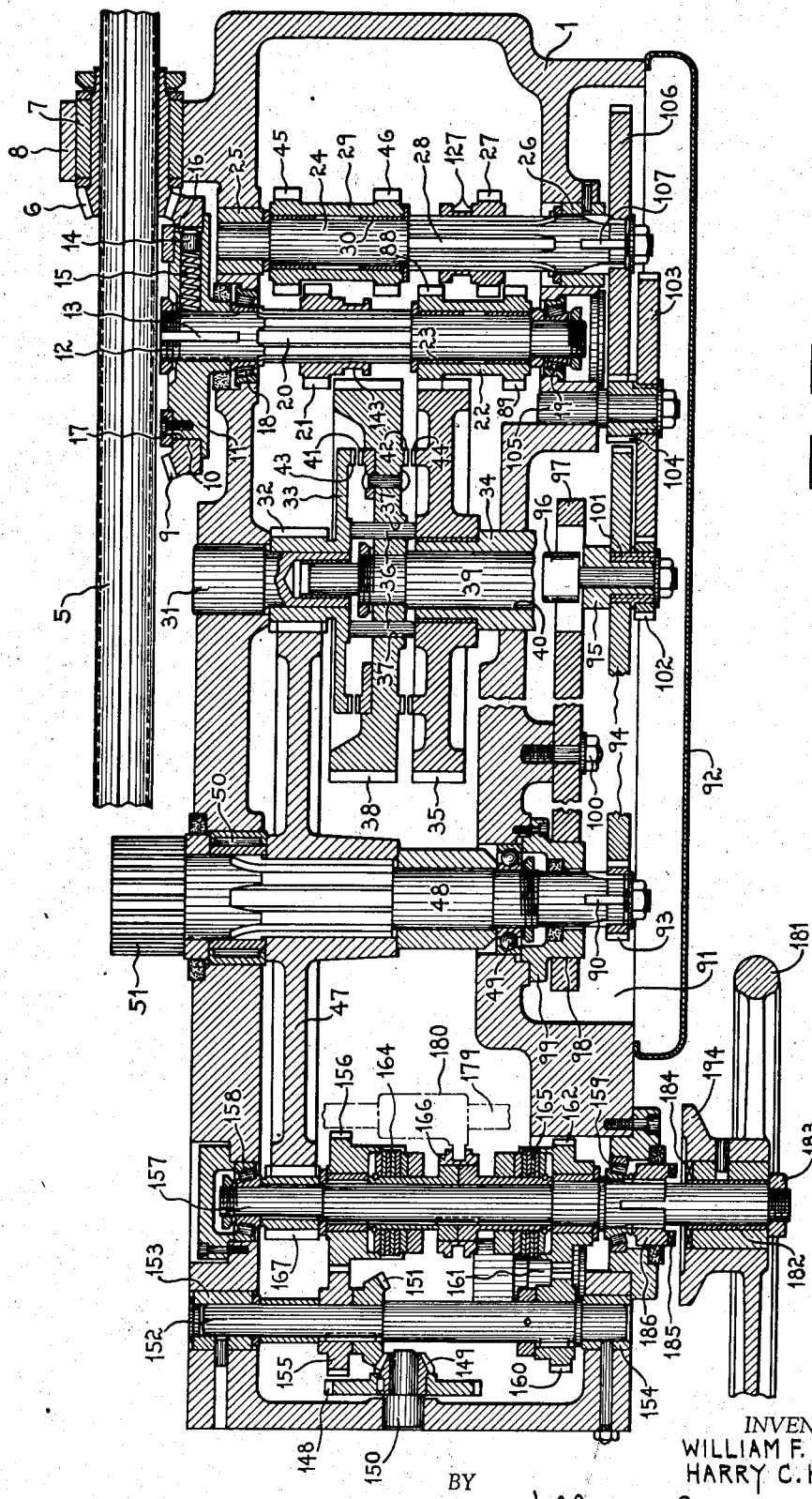

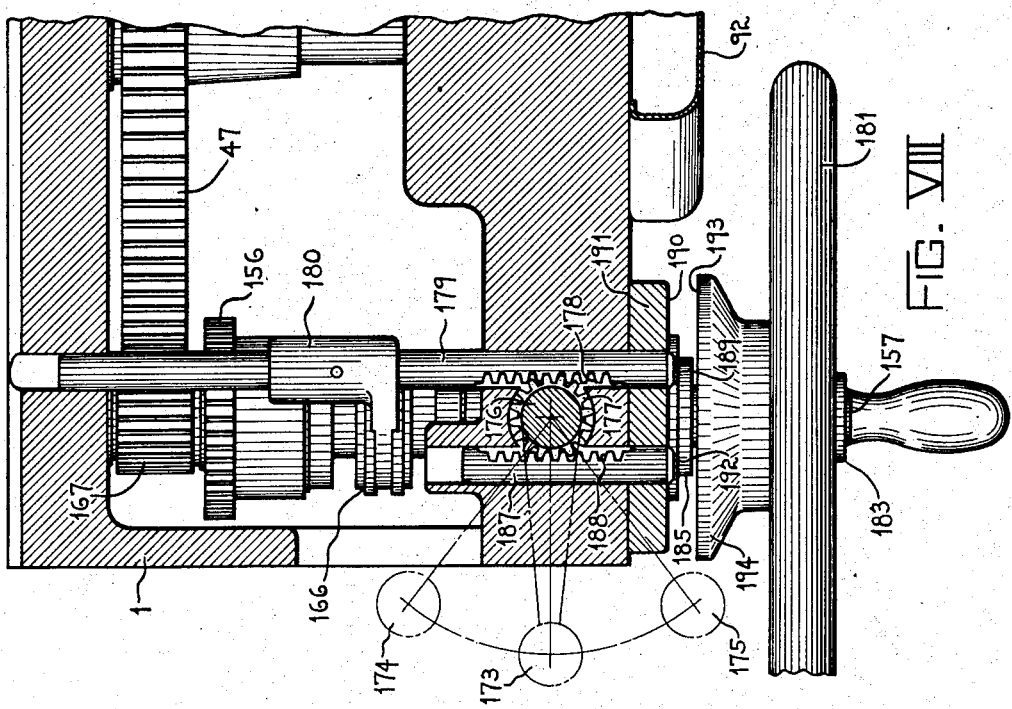
FIG. VII
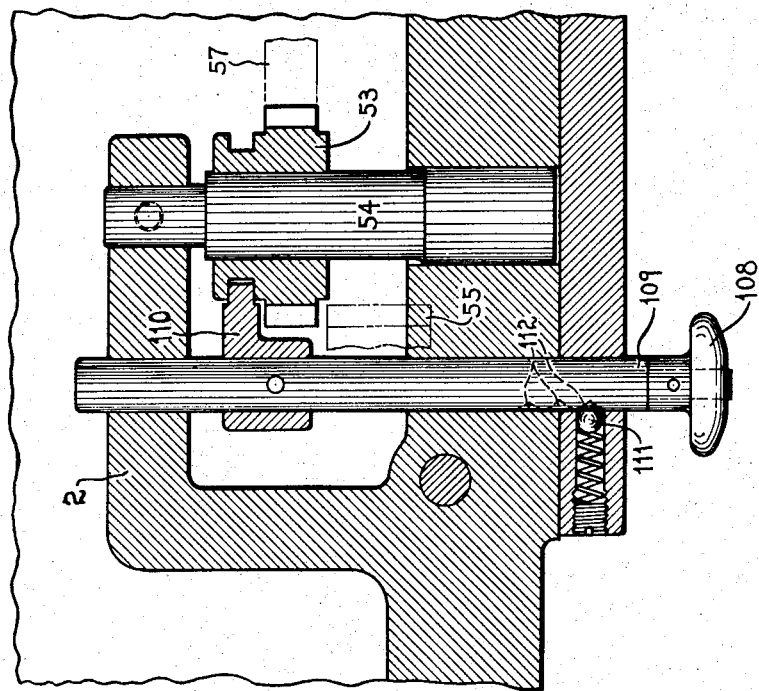
FIG. VII
INVENTORS.
WILLIAM F. GROENE
HARRY C. KEMPER

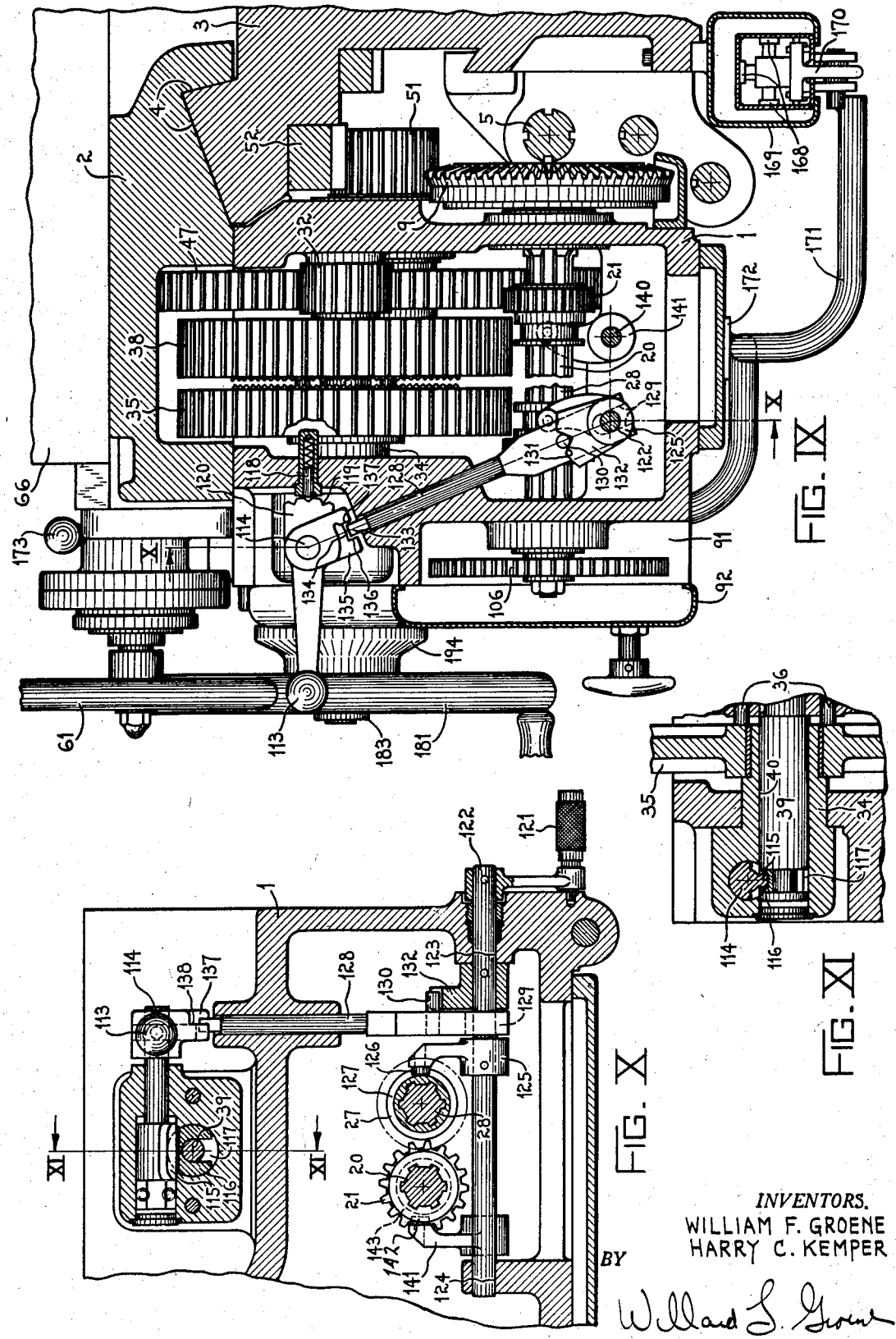

2,354,372

UNITED STATES PATENT OFFICE 2,354,372

TAPER TURNING APPARATUS

William F. Groene and Harry C. Kemper, Cincinnati, Ohio, assignors to The R. K. LeBlond Machine Tool Company, Cincinnati, Ohio, a corporation of Delaware Application February 18, 1942, Serial No. 431,426

7 Claims. (Cl. 82—16)

This invention pertains to taper turning apparatus and is particularly related to transmission mechanism provided in lathe apron for effecting simultaneous operation of the carriage and cross slide and compound rest in simultaneous movement to effect the cutting of tapers on work in a lathe incorporating this novel mechanism.

It is one of the chief objects of this invention to provide in a lathe apron, means for effecting the independent or simultaneous operation of the lathe carriage and cross slide and the simultaneous operation of the carriage and compound rest, for effecting the cutting of tapered work in the lathe in which the apron mechanism is incorporated.

The various different sets of tapers desired from this apparatus may be obtained by means of a quadrant and change gear transmission arrangement interconnecting power from the longitudinal feeding movement of the carriage to either the cross slide or compound rest so as to effect the definite relationship of movement of the latter two members with respect to the longitudinal movement of the carriage of the lathe.

It is a further object of this invention in conjunction with this transmission to provide means for effecting feeding motion in the carriage and cross slide independently and in either direction and to also provide means for effecting the simultaneous operation of the carriage and cross slide in either direction.

It is also an object to permit the independent or simultaneous operation of the carriage, cross slide and compound rest in either direction independently or in either direction jointly.

A further object of this invention is to provide in a lathe apron mechanism for effecting movement to the carriage and cross slide of a lathe an overload clutch device, provided in the input bevel gear engaging a bevel gear driven by the feed rod of the lathe, to prevent damage to any portion of the lathe apron mechanism in the event an overload were applied to the various tool moving members associated with the apron.

Another object of this invention is to provide in a lathe apron mechanism capable of providing taper cutting movement for the cutting tool of the lathe in which the apron is incorporated, means whereby longitudinal movement of the lathe carriage is effected by direct power transmission mechanism from the feed rod of the lathe to the rack pinion shaft of the apron and then to provide power takeoff for actuating the cross slide or compound rest simultaneously with the movement of the carriage, from said rack pinion shaft to in this way utilize the advantage of the gear reduction from the feed rod to the large gear driving the rack pinion shaft.

A further object of this invention is to provide in an apron mechanism capable of providing taper turning movement for the carriage and cross slide members of the lathe, a driven member actuated from the feed rod of the lathe engageable with the longitudinal or cross feeding transmission and to provide means for effecting the engagement of said driven member with each of said transmissions. It is then the object in such a transmission arrangement to have means for effecting the engagement of said driven member with the longitudinal feeding movement of the lathe carriage while having power takeoff transmission mechanism taking off power from the rack pinion and transmitting it through appropriate change gear mechanism to the cross slide of the lathe when simultaneously operating the cross slide and carriage for taper turning.

In conjunction with such a transmission it is an object to have an interference mechanism which shall prevent the engagement of said driven member directly with the transmission mechanism for the cross slide when the driving transmission from the rack pinion shaft, for effecting movement of the cross slide for taper turning, is engaged with the cross slide power transmission so as to prevent the rapid step-up driving action through the transmission connecting the cross slide mechanism with the rack pinion shaft from attempting to vary rapidly and damagingly rotate said rack pinion shaft at high speed.

In conjunction with the above described taper turning apparatus in a lathe apron it is a further object to provide also a rapid traverse actuating device capable of actuating the carriage in longitudinal movement and also to provide this rapid traverse movement when the taper turning movements are being effected in the cutting tool; that is, to effect simultaneous rapid traversing movement in the carriage cross slide or the carriage cross slide and compound rest so that the tool may be rapidly traversed back along its taper cutting path in either direction by said rapid traverse mechanism.

It is also an object of this invention to provide, in conjunction with the change gear transmission mechanism effective between the rack pinion shaft and the cross slide actuating mechanism means whereby either the cross slide or compound rest or both may be engaged with said change gear transmission of the rack pinion shaft so as to further modify and provide additional ranges of tapers to any degree desired through the simultaneous operation of the carriage, the cross slide, and the compound rest tool actuating devices.

Further features and advantages of this invention will appear from the detailed descriptions of the drawings in which:

Figure I is a front elevational view of the lathe apron and carriage incorporating features of this invention.

Figure II is a right hand end elevation of the apron carriage, cross slide and compound rest shown in Figure I.

Figure III is a left hand end elevation of the apparatus shown in Figures I and II.

Figure IV is a fragmentary view partly in section on the lines IV—IV of Figure I, particularly showing the driving transmission mechanism from the cross feed screw to the compound rest.

Figure V is an enlarged fragmentary section on the line V—V of Figure I.

Figure VI is a diagrammatic sectional view through the transmission gearing in the lathe apron shown on the line VI—VI of Figure I.

Figure VII is a fragmentary sectional view of the control mechanism for effecting power operation of either the cross feed or compound rest, shown on the lines VII—VII of Figure I.

Figure VIII is a fragmentary enlarged portion of the left hand end of the lathe apron shown in section on the line VIII—VIII of Figure I particularly illustrating the control mechanisms for disconnecting rotation of the hand wheel when rapid traverse motion is applied to the apron mechanism in either direction.

Figure IX is a vertical transverse section on the line IX—IX of Figure I particularly showing the interference device between the control lever for effecting longitudinal cross feed and for selecting the power drive for taper cutting and the control lever for setting the transmission for effecting taper cutting in operation or disconnecting said transmission.

Figure X is a fragmentary diagrammatic view of the interference mechanism shown on the line X—X of Figure IX.

Figure XI is an enlarged fragmentary view of the control lever for the longitudinal and cross feed clutching mechanism shown particularly on the lines XI—XI of Figures I and X.

This taper turning apparatus is shown applied to a lathe apron I which is appropriately mounted on the lathe carriage 2 which slides longitudinally of the lathe bed 3 on the usual guideways 4. Power for effecting the feeding of the cross feed, the carriage, and the compound rest, in both independent motion for ordinary feeding operation or in simultaneous motion for taper turning, is derived from the usual lathe feed rod 5 which extends longitudinally of the bed 3 and passes through in the keyed sliding driving relationship in the bevel gear 6 appropriately journaled in suitable bearing 7 in a projecting lug 8 of the apron I so that it may be rotatively carried along the feed rod 5 by movement of the apron I longitudinally of the bed 3 of the lathe. The bevel gear 6 in turn drives the annular bevel gear 9 which is journaled on the bearing portion 10 of the overload clutch disc 11 fixed on the shaft 12 by suitable feed driving means 13. In the overload disc 11 are a series of plungers 14 which are normally urged radially outward by compression springs 15 to cause the plungers 14 to normally engage in the notches 16 formed in the bore 17 of the bevel gear 9 so as to form an overload driving connection between the bevel gear 9 and the overload clutch disc 11. Thus when excessive loads would be imposed upon the shaft 12 to resist its rotation from the feed rod 5 the plungers 14 would be depressed radially inward and would be pushed out of the notches 16 and the bevel gear 9 permitted to rotate on the bearing portion 10 of the disc 11 as in conventional overload clutching means. The important feature, however, of this construction lies of course in the unique utilization of an overload clutching device directly adjacent to the bevel gear on the feed rod of the machine so as to prevent damage to any apparatus inside of the lathe apron transmission and consigning the overload strain to mechanism wholly outside of the apron and directly adjacent the feed rod of the lathe.

The shaft 12 is journaled on appropriate bearings 18 and 19 carried in the apron housing I and has slidably mounted on its splined portion 20 a driving gear 21 which may be slid along axially on this splined portion. Rotatably journaled on the shaft 12 is the double gear 22 mounted on suitable bearings 23.

Associated with the shaft 12 is a second shaft 24 appropriately journaled on suitable bearings 25 and 26 in the apron housing I upon which is slidably mounted a driving gear 27 on the splined portion 28 of the shaft 24. Also mounted on this shaft is the double gear 29 suitably journaled on bearings 30.

In the apron housing I is provided a stud 31 upon which is rotatably journaled the pinion 32 having a clutch disc 33 formed integral therewith. Also on sleeve member 34, Figure VI, fixed in the apron housing I is journaled the gear 35. The clutch disc 33 and the gear 35 is kept axially spaced by means of appropriate spacing pins 36 carried slidably mounted in mating bores 37 formed in the shiftable double clutch gear 38 which is fixed on the shifter shaft 39 slidably mounted in the bore 40 of the sleeve 34. On the gear 38 are appropriate clutch teeth 41 and 42 which respectively engage the clutch teeth 43 on the disc 33 and the clutch teeth 44 of the gear 35 by appropriately axially sliding shaft 39 in the sleeve 34.

When the gear 21 is shifted into engagement with the gear 38 power will be thus transmitted from the feed rod 5 to the double clutch gear 38. The gear 38 may be similarly rotated from the shaft 12 by means of the feed rod 5 in the reverse direction when the gear 21 is moved into engagement with the gear 45 of the double gear 29 since the gear 46 of the double gear 29 is constantly in mesh with the gear 38, Figures I and VI. Thus by manipulating the gear 21 to the positions just described the gear 38 may be rotated in either direction.

Power from the gear 38 is connected for longitudinally moving the apron I and carriage 2 through the clutch means 41—43 when the gear 38 is shifted to engage these clutch teeth and is then transmitted through the clutch disc 33 and the integral pinion 32 to the large gear 47 which is rigidly fixed on the rack pinion shaft 48 appropriately journaled in suitable bearings 49 and 50 in the apron housing I and having the usual rack pinion 51 formed integral therewith and operating in the usual rack 52, Figures II and III, fixed to the bed 3 of the lathe.

Power for actuating the cross slide or compound rest is derived from the gear 38 when the clutch members 42—44 are engaged by appropriately sliding gear 38 into engagement with the clutch members to transmit power to the gear 35 which in turn is connected to drive the shiftable gear 53 journaled on a stud 54 fixed in the carriage 2, and which gear 53 may be engaged with the pinion 55 fixed on the cross feed screw 56 or with the gear 57 fixed on the compound rest drive shaft 58 as best seen in Figure V. Thus by shifting the gear 38 so as to engage the clutch members 41—43 longitudinal feeding of the apron and carriage takes place whereas engagement of the clutch members 42—44 of the gears 38 and 35 effects power actuation from the cross slide and by selecting the position for the gear 53, Figure V, either the cross slide or compound rest may be actuated by the power when gears 38 and 35 are in clutch engagement.

The cross feed screw 56 is journaled against axial movement in the lathe carriage by suitable thrust bearings 59 in the conventional manner and operates in a suitable nut (not shown) with its threaded portion 60 and may be rotated manually by means of the usual hand wheel 61 and associated graduated collar 62. Parallel to this cross feed screw 56 is the compound rest drive shaft 58 as best seen in Figure IV, whose spline portion 63 operates in a rotatable sleeve portion 64 journaled in the bracket 65 fixed to the underside of the cross slide 66 and which sleeve 64 has a bevel gear 67 formed thereon which is thus rotated by the drive shaft 58 for any in and out position of the cross slide 66 of the lathe. This bevel gear 67 in turn drives a mating bevel gear 68 having a stem portion 69 appropriately journaled in suitable bearings 70 coincident with the point of pivotal swinging of the compound rest 71. On the upper end of the stem 69 is fixed a bevel gear 72 which in turn drives a bevel gear 73 having a sleeve portion 74 appropriately journaled in bearings 75 carried in a projecting lug 76 formed integral with the bottom slide 71 in the compound rest. This sleeve portion 74 of the bevel gear 73 has fixed in it a key 77 which operates in a suitable keyway 78 formed in the compound rest screw 79 so that as the gear 73 is rotated the screw 79 will be likewise rotated and permitted axial sliding movement in the bore of the sleeve portion 74 of the bevel gear 73 while the screw is rotated in the nut 80 fixed in the projecting lug 81 also formed integral with the bottom slide 71 of the compound rest. Appropriate manually operable means comprising the hand wheel 82 connected through the sub-shaft 83 in the bevel gear 84 and the bevel gear 85 on the screw 79 permits manual operation of this screw for accurate setting of the cutting tool 86 carried on the compound rest, top slide 87.

In order to effect taper cutting movement in the cutting tool 86 it is desirable to have the longitudinal feeding of the carriage and the cross feed movement of the cross slide or the feeding movement of the compound rest taking place simultaneously. In order to accomplish this simultaneous action of the above tool feeding members, the double gear 22 is provided with a gear 88 which is constantly in mesh and driven by the gear 35, Figure VI. The slidable gear 27 on the splined portion 28 of the shaft 24 is arranged to be alternately engaged either with the gear 35 or with the gear 89 of the double gear 22. Thus at one time the gear 35 may be directly connected to the shaft 24 through the gear 27 or may be connected to the shaft 24 through the gears 27—89—35 to effect reversal of direction of rotation between the gear 35 and the shaft 24. When the simultaneous operation is desired the clutch gear 38 is moved to engage the clutch members 41—43 so as to effect the usual driving power to the longitudinal rack pinion 51 as already described. Thus the rack pinion shaft is being driven from the feed rod 5 through the bevel gears 6—9, the shaft 12, and the gears 21—38 or 21—45 and 46—38 depending upon which direction of longitudinal feeding or direction of taper turning it is desired to use. It is to be clearly noted that the gear 35 is not at this time being driven from the double clutch gear 38 but is connected to be driven by power from the rack pinion shaft 48 through the change gear mechanism to be described as follows:

On the outer end of the rack pinion shaft 48 is provided a projecting splined end portion 90 which projects into a change gear cavity 91 formed in the front face of the apron housing 1 and is closed over by a suitable closure cover 92 to protect the operator from the various rotating gears. On the outer end of the rack pinion shaft 48 may be mounted change gears comprising for example, the gear 93 which is in engagement with a gear 94 carried on a change gear bushing 95 on the usual stud 96 adjustably mounted on a quadrant 97 pivotally mounted around the axis of the rack pinion shaft 48 by a suitable bearing means 98 on the projecting bushing 99 fixed to the apron housing 1, and lockable in adjusted position by a suitable clamping means 100. The gear 94 is fixed on a change gear sleeve 101 so as to connect its driving rotation directly to another change gear 102 from which power is transmitted to another change gear 103 and through a suitable pinion 104 directly connected to it which is carried on a stud 105 fixed in the apron housing 1. This pinion 104 in turn drives a change gear 106 which is mounted on the outwardly projecting end portion 107 of the shaft 24, whereby this shaft is rotated so as to drive the gear 27 and thereby apply power to the shaft 35 either directly from the gears 27—35 or to the gearing 27—89 and 88—35 as described. The gear 35 under these circumstances may be connected either to the cross feed screw or the compound rest drive shaft 58, Figure V, as described. Thus we have when effecting simultaneous operation of the carriage and cross slide or the carriage and the compound rest driving power transmitted to the rack pinion shaft and from here taking off power to the rack pinion to the rack on the bed for the longitudinal movement of the carriage and taking power off of the same rack pinion shaft and transmitting it through a series of selectable change gears to a reversing mechanism which in turn is connected to the cross feed or compound rest driving screws.

It is thus to be noted that by appropriately selecting the various change gears in the change gear cavity 91 any variety of movement of carriage and cross slide may be effected for cutting any desired tapers on the lathe. Further modification of the ratios to be obtained with the select set of change gears may also be had by fine setting and instruments of positioning of the compound rest and having it also operate simultaneously with the carriage or with both the carrige and cross slide operating which may be effected by permitting the gear 53, Figure V, to be simultaneously engaged with the gears 55 and 57 in rare instances where it might be desirable to have the simultaneous operation of the cross feed and compound rest taking place.

This selection of movement of the gear 53 may be effected by means of the control knob 108 carried on the shifter rod 109 which is connected through a yoke 110 to the gear 53 to thereby effect either the operation of the cross slide or the compound rest or both simultaneously depending upon the position of the rod 109 as determined by the detent mechanism 111 operating in the various detent notches 112.

The clutch gear 38 may be moved by sliding its shaft 39 by means of the feed selection lever 113 carried on the rock shaft 114 in the sleeve member 34, Fixture XI, and which has a projecting tooth 115 which operates in a shoe 116 in the annular groove 117 in the axially shiftable shaft 39. Suitable detent means comprising the plunger 118 carried in the apron housing 1 and operating in the notches 119 formed in the segmental integral portion 120 of the lever 113 serves to position this lever and the shaft 39 in the neutral position, as shown in Figures VI and IX or in either engagement of the clutch members 41—43 or in the clutch members 42—44.

The means for shifting the gear 27, Figure VI, to either the neutral position shown or into engagement with either of the gears 88 or 89 comprises a lever 121, Figures II and X, carried on a rock shaft 122 appropriately journaled in the apron housing 1 in suitable bearings 123 and 124 and has fixed on it a yoke 125 having a projecting pin 126 which engages in the annular slot 127 of the gear 27 so that when the lever is moved to either of the three positions shown in Figure II, a movement of the gear to commensurate position is effected.

An important characteristic feature of this invention is to prevent the gear 38 from being moved so as to engage the clutch members 42—44 when the gear 27 is shifted into engagement with the gear 89 of the double gear 22, it being permissible only to have the clutch members 42—44 in engagement when the gear 27 is in the neutral position. The reason for this desired operation is that in the event the gear 27 was engaged with the gear 89 when gear 38 was connected to gear 35 through the clutch members 42—44 the result in rapid speed up drive from the shaft 12 through gear 21 to the gear 38 or from gear 21 through gear 45 and the gear 46 through the gear 38 would cause a very rapid rotation of the rack pinion 51 which cannot take place without damage to the apparatus and the various change gears in the change gear cavity 91 since the carriage could not be moved along to such a speed up gear transmission at such a rate without effecting great strain in the driving gears resulting in possible damage to the gearing. It is therefore desirable to interlock the movement of the gear 27 with that of the gear 38 through the medium of the interference mechanism particularly shown in Figures IX and X. This interference mechanism comprises a rod 128 slidably mounted in the apron 1 and having a bifurcated portion 129 straddling the rock shaft 122 so as to rigidly support the outer end of the rod 128 where it projects downwardly into the apron cavity as shown best in Figure IX. In this portion 129 is provided a pin 130 which operates in a detent notch 131 in the segmental lug 132 fixed to the rock shaft 122 so that when the rock shaft and lever 121 are so shifted as to have the gear 27 in neutral position the pin 130 will be in the detent notch allowing it and the rod 128 to be moved downwardly and withdraw its end 133 away from the lever 113 and its rock shaft 114.

When the control lever 121 is moved to either of the engaged positions of the gear 27 with the gear 88 or the gear 89 the end portion 133 of the rod 128 will be thrust upwardly toward the lever 113.

This lever 113 has formed on it a downwardly projecting lug having a notched portion 134 extending through the lug 135 axially of the rock shaft 114 so as to permit sidewise sliding of the rock shaft 114 and the lever 113 when in the neutral position of non-engagement of the double clutch gear 38 with either of the clutch members 43 or 44. Normally, the projecting end 133 of the rod 128 projects into this axially extending slot 134. When the lever 113 is moved to the right, Figure X, sliding the shaft 114 thus to the right, the side face 136 of the slot 134 will be so positioned as to engage the end 133 of the rod 128 when the lever is attempted to be swung downwardly to thus prevent this downward movement of the lever 113. This slot is cut away on the other side so that the lever 113 when in this right hand position may be moved upwardly to engage the gear 38 with gear 35 through the medium of the clutches 42—44 to set in motion the normal cross feeding of the lathe. When the lever 113 is moved axially to the left, Figure X, the side surface 137 of the axially extending slot 134 will engage the end 133 of the plunger 128 and will prevent the lever 113 from being raised but will permit it to be lowered since the portion of the slot 134 opposite the portions 137 is cut away so as to permit normal engagement of the longitudinal feeding motion while preventing the engagement of the cross feeding motion to the lathe cross slide.

The object of this arrangement is that it is impossible for the operator to accidently go from longitudinal feed directly into cross feed by accidently pushing the handle too far past the central neutral position. This is prevented as it is necessary for the operator first to move to the neutral position being stopped by the end 133 of the rod 128 and then to move the handle axially before being able to go into the cross feed motion from the longitudinal feeding motion and similarly when in cross feeding position the lever cannot be accidently moved into longitudinal feeding position to permit that. This interference arrangement thus prevents accidently shifting from cross to longitudinal or from longitudinal to cross movement without first shifting the handle and thus preventing accidental movement of the lever too far from the neutral position.

And in addition to this feature in connection with the feed control lever for both the longitudinal and cross feed the rod 128 is arranged to be moved upwardly as explained by moving the lever 121 to either of the operating driving positions for the gear 27 causing its end 133 to project upwardly beyond the bottom of the slotted portion 134 and to go up the side face 138 of the lever 113 so that the gear 27 can only be rendered engageable when the lever is moved fully to the left or in longitudinal feeding position.

It is obvious that when the gear 27 is thus moved into operative driving relationship by the lever 121 the projecting end 113 which is now moved up beside the face 138 on the lever 113 will prevent its movement axially to the right to a position where it might be possible to engage the lever by further upward movement in the cross feed position and cause a damaging operation to the lathe mechanism as described above because of the speed up drive which would then be effective through the change gear mechanism to the rack pinion shaft 48.

Thus we have in this apparatus a single lever control for effecting the cross and longitudinal feeding movement together with a third lever for instituting the operation of the cross slide movement in either direction simultaneously with the operation of the longitudinal feeding movement but providing at the same time an interference arrangement whereby neither the cross nor longitudinal movement may be accidently operated consecutively and also presenting the engagement of the normal cross feeding movement while the cross feeding power for taper turning is being operated.

The normal direction of feeding motion is controlled by means of the control lever 139, Figure II, which is carried on a rock shaft 140 in the apron housing I similar to that of the rock shaft 122 shown in Figure X and has fixed on it a yoke 141 having a pin 142 operating in the annular groove 143 of the shiftable gear 21 and which may be moved to either of the two positions shown in Figure II or the neutral position of the gear as illustrated in Figure IV so as to effect the longitudinal or cross feeding in either direction when manipulating the lever 113 to institute these movements.

It will thus be seen by observing Figure II that the combination of these two levers 121 and 139 effects the cutting of tapers in either direction, that is either having the small end of the taper towards the headstock of the lathe or the small end of the taper to be cut towards the tailstock end of the lathe and by manipulating the lever 139 itself with the lever 121 in neutral feed position in either direction of longitudinal or cross feed may likewise be effected for the normal turning operation.

Associated with the apron transmission above described is a power rapid traverse mechanism capable of effecting rapid traverse of the carriage, the cross slide, or compound rest individually. Also with this arrangement the rapid traverse movement of the carriage and cross slide may be affected simultaneously; the carriage and compound rest simultaneously; or all three of these members may be rapid traversed simultaneously. These rapid traversing movements may be effected for taper cutting movement of the tool feeding devices. The rapid traverse power for effecting said rapid traverse movement is derived from the rapid traverse motor 143, Figure III, which is fixed to the left hand face 144 of the apron housing I by suitable flange connecting mounting means 145 and appropriate screw 146 best seen in Figure I. On the shaft of the motor 143 is provided a driving pinion 147 which is arranged to drive the gear 148, Figure VI, which is fixed to the sleeve portion of a bevel gear 149 journaled on a stud 150 fixed in the housing. This bevel gear 149 in turn drives a bevel gear 151 fixed to a shaft 152 appropriately journaled in bearings 153 and 154 in the apron housing I. Fixed on this shaft 152 is a gear 155 which drives directly into a clutch gear 156 journaled on a shaft 157 carried in appropriate bearings 158 and 159 in the apron housing I. Also on the shaft 152 is fixed the gear 160 which drives through an idler gear 161, best seen in Figure I, the other clutch gear 162 also journaled on the shaft 157. In this way rotation from the shaft 152 causes the gear 156 to rotate in one direction while the gear 162 rotates in the opposite direction.

Conventional clutching means comprising the clutches 164 and 165 respectively actuatable by suitable shifter spool 166 in a conventional manner effects alternate driving connections between the gear 156 and the shaft 157 or the gear 162 and the shaft 157 do thereby effect the reversal of drive through the shaft 157 from the shaft 152 which is normally constantly rotated one direction by the rapid traverse motor 143.

Fixed on the shaft 157 is a driving pinion 167 which is in driving engagement with the gear 47 on the rack pinion shaft 48.

Normally the rapid traverse motor 143 is continuously operating in constant speeds by electrical power received from the conductors 168 extending longitudinally of the bed 3 of the lathe and appropriately carried in the protecting box 169. An appropriate trolley 170 carried by the conduit 171 attached to the apron by suitable means 172 carries the electrical power from the conductors 168 through the conduit 171 to a rapid traverse motor 143.

Noting particularly Figure VIII, rapid traverse power is connectable in either direction to the gear 147 of the rack pinion shaft 48 for longitudinal movement of the apron and carriage or for the simultaneous rapid traverse movement of the carriage and cross slide or compound rest by manipulating the rapid traverse lever 173 as indicated by the positions 174 and 175 in Figure VIII. This lever 173 is carried on a rock shaft 176 appropriately mounted in the apron casting I and having a pinion 177 formed thereon which engages in a rack 178 in a shifter rod 179 appropriately, slidably mounted in the apron I. On this shifter rod 179 is a shifter yoke 180 which engages the shifter spool 166 so that by moving the lever to either of the positions 174 or 175 the rapid traverse movement may be effected.

On the shaft 157, Figures VI and VIII is mounted the usual manual operating hand wheel 181 for manually moving the carriage and apron longitudinally of the bed of the lathe. This handwheel 181 is appropriately journaled by suitable bearings 182 on the outer end of the shaft 157 and confined in outward axial movement by a nut 183 fixed to the outer end of this shaft. A portion of this handwheel 181 is provided with clutch teeth 184 which are arranged to engage mating clutch teeth 185 on a clutch sleeve 186 securely fixed to the shaft 157 so that when the hand wheel 181 is moved inwardly to engage the clutch members 184—185 the shaft 157 may be rotated by means of the handwheel 181 for effecting longitudinal manual adjustment of the carriage along the lathe bed.

In order to prevent the handwheel being engaged with the shaft 157 when the rapid traverse power from the motor 143 is applied to the shaft for rapid traversing the carriage along the bed, means are provided to automatically effect disengagement of the clutch members 184—185 by automatically axially moving the handwheel out against the nut 183.

This apparatus is particularly shown in Figure VIII and comprises a second plunger 187 mounted in the apron casting and having a rack 188 which is engaged by the pinion 177 of the rock shaft 176. By this arrangement the end portion 189 of the shifter rod 179 is moved outwardly from the face 190 of the mounting bushing 191 fixed on the apron 1 when the rapid traverse member is moved to the position 174 and that also the end 192 of the plunger 187 is mounted outwardly when the lever 173 is moved to the position 175. Both of these end portions 189 and 192 are arranged to abut against the surface 193 of the flange portion 194 formed on the handwheel 181 so that when the rapid traverse lever is moved to either of the active or rapid traverse position 174 or 175 one or the other of the ends 189 or 192 will move outwardly abutting against the surface 193 of the portion 194 of the handwheel 181 to automatically move it axially outward against the nut 183 to thereby disengage the clutch members 184—185 so that the handwheel will not be connected to the shaft when rapid traverse power is applied thereto and thus prevents the rapid rotation of the handwheel 181 in rapid traverse movement which might otherwise endanger the operator of the machine.

Having thus fully set forth and described our invention what we claim as new and desire to secure by United States Letters Patent is:

1. In an apron transmission mechanism for effecting taper cutting by simultaneous operation of the carriage and cross slide of a lathe, a power input shaft, means for reversably connecting power from said input shaft to a driven element, means for alternately connecting said driven element for longitudinal feeding of the carriage or cross feeding of the cross slide of said lathe, and means for connecting said driven member for the longitudinal feeding of said carriage and driving the cross slide mechanism of said lathe through the apron transmission with the longitudinal movement of said carriage, said last mentioned means incorporating change gear mechanism for effecting relative differences of feed relative movement of the carriage and cross slide, and rapid traverse power means reversably connectable to the means for effecting the longitudinal movement of said apron and carriage.

2. In an apron transmission mechanism for effecting taper cutting by simultaneous operation of the carriage and cross slide of a lathe, a power input shaft, means for reversably connecting power from said input shaft to a driven element, means for alternately connecting said driven element for longitudinal feeding of the carriage or cross feeding of the cross slide of said lathe, and means for connecting said driven member for the longitudinal feeding of said carriage and driving the cross slide mechanism of said lathe through the apron transmission with the longitudinal movement of said carriage, said last mentioned means interconnecting the movement of said carriage to actuate said cross slide simultaneously therewith incorporating reversing transmission mechanism for effecting opposite directions of movement of said cross slide relative to corresponding directions of movement of said carriage, and power rapid traverse mechanism reversably connectable to said means for longitudinally moving said carriage.

3. In an apron transmission mechanism for lathe, an input shaft, a driven member, means for connecting said input shaft to said driven member, means for alternately connecting said driven member to the rack pinion driving mechanism or the cross slide mechanism of said lathe, and means for simultaneously connecting said driven member to said rack pinion driving mechanism and connecting said rack pinion driving mechanism reversably to the cross slide mechanism of said lathe, and rapid traverse power means reversably connectable to said rack pinion transmission mechanism.

4. In an apron transmission mechanism for lathe, an input shaft, a driven member, means for connecting said input shaft to said driven member, means for alternately connecting said driven member to the rack pinion driving mechanism or the cross slide mechanism of said lathe, and means for simultaneously connecting said driven member to said rack pinion driving mechanism and connecting said rack pinion driving mechanism to said cross slide mechanism through change gearing transmission means, and rapid traverse power means reversably connectable to said rack pinion transmission mechanism.

5. In an apron transmission mechanism for lathe, an input shaft, a driven member, means for reversably connecting said driven member to said input shaft, means for alternately connecting said driven member to the rack pinion driving mechanism or the cross slide driving mechanism of said apron, and means for simultaneously connecting said driven member to said rack pinion driving mechanism and connecting said rack pinion driving mechanism reversably to the cross slide mechanism of said lathe, and rapid traverse power means reversably connectable to said rack pinion transmission mechanism.

6. In an apron transmission mechanism for lathe, an input shaft, a driven member, means for reversably connecting said driven member to said input shaft, means for alternately connecting said driven member to the rack pinion driving mechanism or the cross slide driving mechanism of said apron, and means for simultaneously connecting said driven member to said rack pinion driving mechanism and connecting said rack pinion driving mechanism reversably to the cross slide mechanism of said lathe, and said interconnecting means between said rack pinion driving mechanism and the cross slide mechanism of said lathe comprising change gear transmission means, and rapid traverse power means reversably connectable to said rack pinion transmission mechanism.

7. In a lathe apron transmission mechanism, an input shaft, a driven member actuatable by said shaft, means for alternately connecting said driven member to a rack pinion driving mechanism or to a cross slide driving mechanism on said lathe, a single lever control for moving said driven member to a neutral position or an operative position for effecting either longitudinal movement of the apron or cross slide movement, means for interconnecting the rack pinion driving transmission directly to said cross slide transmission mechanism of said lathe, and interference mechanism to render said last mentioned interconnecting driving means between the rack pinion and cross slide mechanism inoperative when said driven member is connected to said cross slide mechanism.

WILLIAM F. GROENE.
HARRY C. KEMPER.